United States Patent
Guo et al.

(10) Patent No.: US 7,526,308 B2
(45) Date of Patent: Apr. 28, 2009

(54) ADAPTIVE CONTROL PHYSICAL CARRIER SENSE PARAMETERS IN WIRELESS NETWORKS

(75) Inventors: Xingang Guo, Portland, OR (US); Jing Zhu, Hillsboro, OR (US); Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 688 days.

(21) Appl. No.: 11/118,225

(22) Filed: Apr. 28, 2005

(65) Prior Publication Data

US 2006/0264229 A1    Nov. 23, 2006

(51) Int. Cl.
*H04B 7/00* (2006.01)
*H04Q 7/20* (2006.01)

(52) U.S. Cl. ............... 455/522; 455/69; 455/126; 455/127.1

(58) Field of Classification Search ............. 455/69, 455/522, 127.1, 126, 9, 11.1, 13.4, 515, 453, 455/115.1, 115.3, 68, 422.1, 446, 127.2; 370/342

See application file for complete search history.

(56) References Cited

U.S. PATENT DOCUMENTS

| | | | |
|---|---|---|---|
| 7,209,713 B2 * | 4/2007 | Nakao et al. | 455/69 |
| 2002/0177462 A1 * | 11/2002 | Cao et al. | 455/522 |
| 2004/0110477 A1 * | 6/2004 | Nishimura et al. | 455/127.1 |
| 2005/0047361 A1 | 3/2005 | Fudim et al. | |
| 2005/0085259 A1 | 4/2005 | Conner et al. | |
| 2005/0108527 A1 | 5/2005 | Ginzburg et al. | |
| 2005/0129051 A1 | 6/2005 | Zhu et al. | |
| 2005/0130713 A1 * | 6/2005 | Simpson et al. | 455/574 |
| 2005/0213601 A1 | 9/2005 | Ginzburg et al. | |
| 2005/0220131 A1 | 10/2005 | Ginzburg et al. | |

* cited by examiner

*Primary Examiner*—John J Lee
(74) *Attorney, Agent, or Firm*—Schwabe, Williamson & Wyatt, P.C.

(57) ABSTRACT

Apparatuses and methods for determining and applying receiving sensitivity threshold and/or energy detection threshold values for one or more nodes of a wireless network cell are described herein.

18 Claims, 5 Drawing Sheets

ADAPTIVE CONTROL PHYSICAL CARRIER SENSE PARAMETERS IN WIRELESS NETWORKS

BACKGROUND

Wireless local area networks (WLANs) such as Large-Scale Dense Networks (LSDNs) are becoming prevalent in many environments such as in office buildings, schools, factory floors, and the like. In a typical Institute of Electrical Electronic Engineer (IEEE) 802.11x standard (i.e. 802.11a, 802.11b, and so forth, herein, simply 802.11) wireless network, an access point (AP), which may be any type of electronic or computing device such as a workstation, a router, or a gateway, acts as an interface for one or more wireless devices (i.e., stations (STAs)) to a wired network (e.g., LAN). In LSDN networks, a large number of access points (AP) are often packed closely together servicing many clients or stations (STAs) in a relatively confined area. Each AP/STAs group forms a wireless network cell (herein "cell"), which in such a dense environment, typically overlap other cells. Because these cells tend to overlap in heavily dense environments, signals transmitted within a cell will typically experience interference from signals generated from nodes belonging to other cells (note that for purposes of this description, a node may be an access point or a client or station). This is in part because WLAN was originally designed for situations whereby a single access point (AP) would service a few stations (STA) in a relatively isolated environment. Further, for the 802.11b/g standards (2.4 GHz band), for example, only three non-overlapping channels are available for WLAN networks or devices (i.e., access points or stations). Thus, in high density environments where there are many cells closely located to each other, adjacent overlapping cells will often be using the same channels that may cause signals generated in one cell to substantially interfere with communication between nodes of another cell.

The current solution to the interference problem is to fine-tune (typically reduce) the transmission power of each of the nodes (e.g., access point or station) within a cell so that the transmissions generated by the access point and/or the stations of one cell (a cell will typically include one station and a plurality of stations) will minimally interfere with the communication operations in other nearby cells.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include determination and application of receiving sensitivity threshold value of one or more nodes of a wireless network cell based at least in part on the transmission power or powers associated with the cell.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

Figure 1:
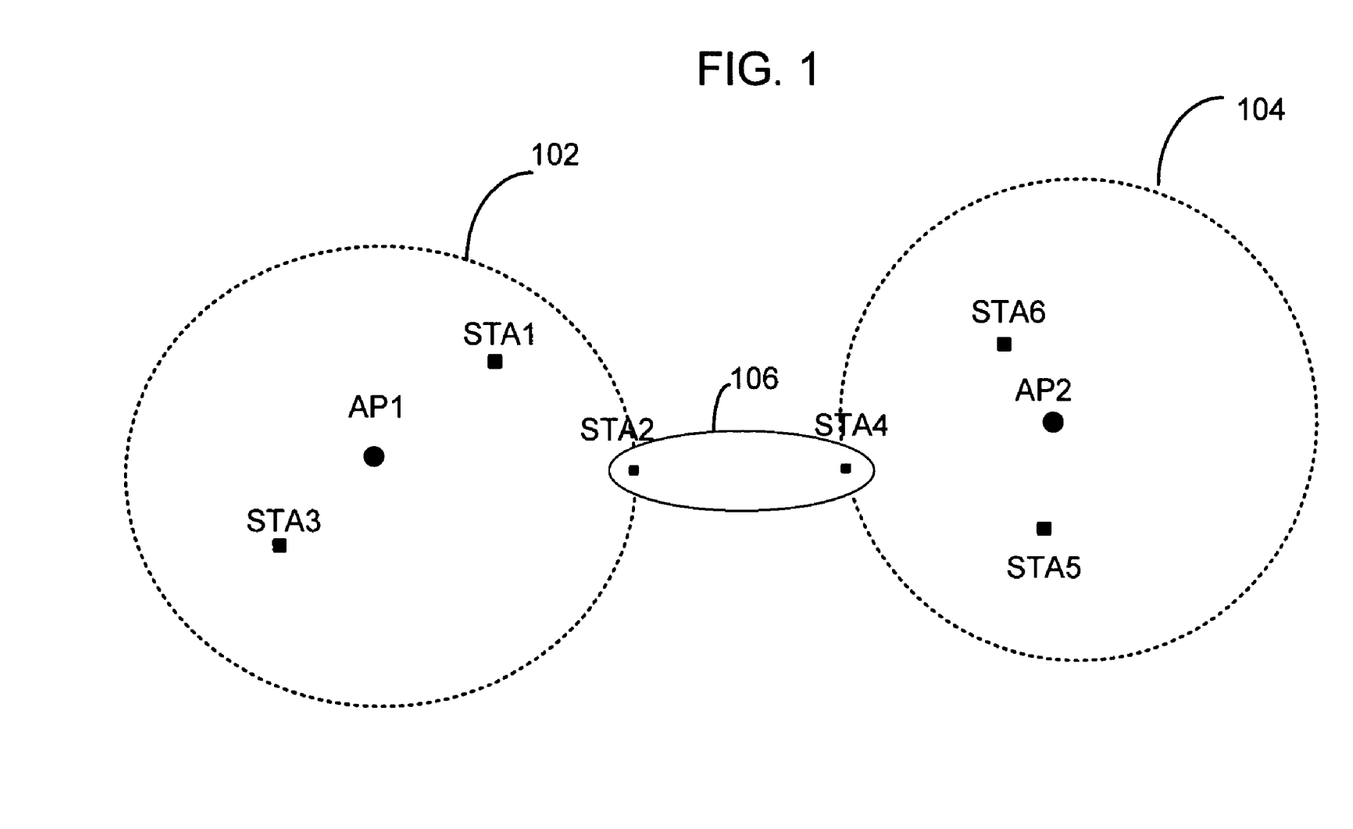
FIG. 1 illustrates an example two wireless network cells.

FIG. 1 depicts two example cells 102 and 104, in accordance with some embodiments. For the embodiments, each cell includes an access point (AP1 and AP2) and a plurality of stations (STA1 to STA3 or STA4 to STA6). A cell may be defined by the distance between the cell access point (AP) and the cell station (STA) that is the furthest away from the cell AP. For example, in the case of cell 102, the size (or covered area) of the cell 102 may be determined by distance between the cell access point (AP1) and the cell station (STA2), which is the farthest away from the cell access point (AP1). Similarly, for cell 104, the size (or covered area) of the cell 104 may be determined by the distance between the cell access point (AP2) and the cell station (STA4) that is the farthest away from the cell access point (AP2). Note that in this illustration, the two cells 102 and 104 do not overlap. Yet because of the interference/sensing range of the individual cell nodes, there may be significant signal interference when a cell node (STA or AP) is trying to communicate with another node of the same cell. The interference/sensing range may define the maximum distance between two nodes (that are not necessarily in the same cell) that can hear/sense each other. For example, in FIG. 1, the oval 106 represents the interference/sensing range of STA2 and/or STA4. Note that the interference/sensing range 106 depicted in FIG. 1 has a particular oval shape. However, the interference/sensing range shape depicted here is shaped as an oval for purposes of simplicity only and an actual interference/sensing range may actually take on any one of a number of other shape types. In any event, the signals generated by STA2 may cause "interference" with STA4, or vice versa, even though they belong to different cells as a result of, for example, the interference/sensing range.

As briefly described above, because signals of wireless network cells often interfere with each other such as in the situation where a Large-Scale Dense Network (LSDN) is implemented, signal interference may become a significant problem. To further illustrate, in FIG. 1, signals generated in cells 104 and 106 may interfere with the communication of STA2 and STA4 with AP1 of cell 102. In this case, simply fine-tuning the transmission powers of the nodes may not resolve this problem because of the specific locations of the various nodes relative to the various cells.

When nodes within a cell are communicating, for example, nodes in an 802.11 WLAN basic service set (BSS) network, stations (STAs) may communicate with a single access point (AP). There are two aspects to such communication process, receiving and transmitting signals. According to various embodiments, in order to limit the interfering signals caused by, for example, transmissions from adjacent cells, the cell nodes (either access point or one or more stations) of a cell may be assigned a receiving sensitivity threshold value (R_t) that is at least partly based on the transmission power assigned to that cell to filter out, for example, the interfering signals generated by the other cells (note here that the transmission power value for each cell node in a cell will often be the same for all of the nodes in that cell). To put this in another perspective, in order to achieve this, the receiving range (which may be linked to the receiving sensitivity threshold—R_t) associated with the cell nodes of a cell may be matched with the cell size (which may be linked to the transmission power value—Tx) of that cell. Further, in some embodiments, an energy detection threshold value (ED_t) for the cell nodes may be determined based at least in part on the receiving sensitivity threshold value (R_t) of the nodes. The energy detection threshold value (ED_t) may be used to determine whether the cell medium is clear for transmitting a signal. The receiver sensitivity threshold (R_t) and the energy detection threshold (ED_t) will be discussed in greater detail below.

Figure 2:
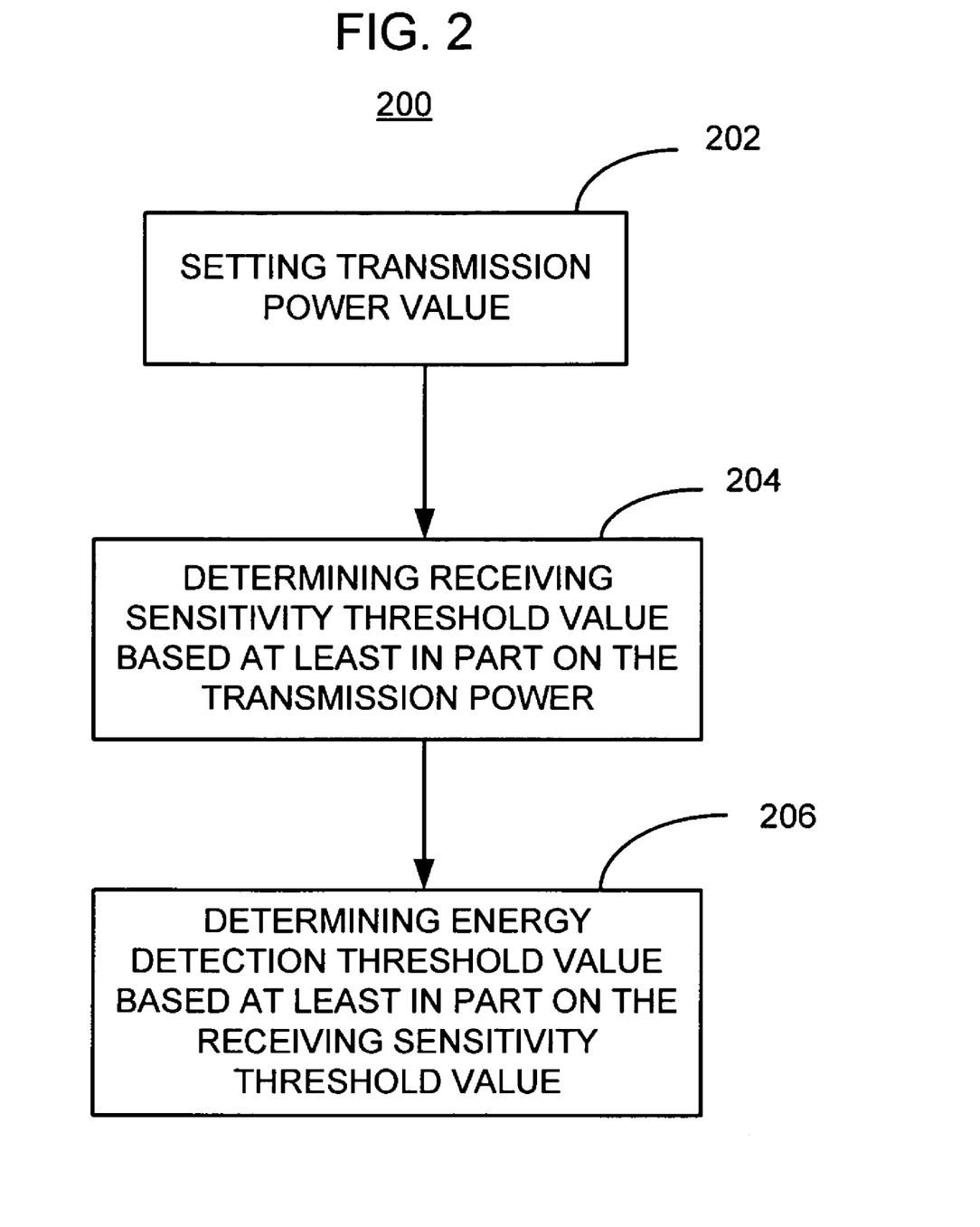
FIG. 2 illustrates a process for generating a receiving sensitivity threshold value and energy detection threshold value based at least in part on preset transmission power in accordance with some embodiments.

FIG. 2 depicts a process for generating a receiving sensitivity threshold value (R_t) and an energy detection threshold value (ED_t) that are employed by cell nodes of a wireless network cell (herein "cell") in accordance with some embodiments. For the embodiments, the process 200 may begin when a transmission power value (Tx) for a cell is set at block 202. In these embodiments, one or more of the cell nodes in the cell (i.e., AP and STAs) may each be designed to transmit signals at the same transmission power level. In other embodiments, however, the transmission power for various cell nodes of a cell may vary. The transmission power value (Tx) that is set may be sufficiently high so that a signal generated by any node in the cell will reach any other node in the cell with strength high enough to be clearly separated from noise floor. In some embodiments, the transmission power values (Tx) for each of the cell nodes may be set to be the same value. Further, the transmission power value (Tx) may be set so that it is not too powerful to significantly interfere with nodes of other cells. In some embodiments, the determination of transmission power value of a cell node may be accomplished, for example, by having the access point (AP) of the cell communicate and/or negotiate with the access points of other cells. For instance, in FIG. 1, AP1 may communicate and negotiate with AP2 to determine the transmission power value (Tx) used by each of the cells 102 and 104.

After setting the transmission power value (Tx) of a cell (e.g., one or more nodes of the cell), a receiving sensitivity threshold value (R_t) may be determined based at least in part on the transmission power value (Tx) set previously at block 204. The receiving sensitivity threshold value (R_x) may be the minimum signal strength that a signal or signals must have for the signal or signals to be accepted as a "legitimate" or valid signal rather than interference or noise generated by, for example, adjacent cells. The receiving sensitivity threshold value (R_t) may be determined (i.e., fine-tuned) based at least in part on the transmission power value set previously by matching the receiving range to the cell size.

In order to match receiving range to cell size, the following example is provided. Given a transmission power value (Tx), the received signal strength may monotonously decrease as the transmission distance increases. A cell node (e.g., AP and/or STA) may only receive a signal if the signal strength equals or exceeds the receiving sensitivity threshold (R_t). By tuning the receiving sensitivity thresholds (R_t) of the cell nodes, a cell node is able to control how far a valid signal can reach. As a result, a cell STA will only receive a signal from its own AP, because all other APs are out of receiving range, thus preventing the reception of unintended signals. That is, the receiving range is based on the receiving sensitivity threshold value (R_t) of the cell nodes as well as the transmission power value (Tx) of the cell nodes established previously. By tuning the receiving sensitivity threshold value (R_t), the receiving range can be adjusted to match the cell size. In order to better filter out signals from nearby cells, the receiving sensitivity threshold (R_t) may be desensitized, but may be sensitive enough to allow successful communications between AP and all STAs in its cell.

Once the receiving sensitivity threshold value (R_t) is determined, an energy detection threshold value (ED_t) may be determined based at least in part on the determined receiving sensitivity threshold value (R_t) at block 206. The energy detection threshold value (ED_t), in some embodiments, may be used during clear channel assessment (CCA) mode to determine whether the medium of a cell is clear for transmitting a signal. For example, the energy detection threshold value (ED_t) may be determined using, in part, the receiving sensitivity threshold value (R_t) previously determined and the minimum signal-to-interference ratio (SIR_t) needed to sustain a given data rate (the SIR_t values are standards set by the IEEE for specific data rates in order to obtain desirable throughputs). Mathematically, the relationship is as follows (note the unit is in dB):

$$ED\_t = R\_t - SIR\_t$$

Support for this relationship may be based on the following mathematical derivations. That is, according to the logarithm pathloss model, the receiving signal strength and transmission power can be characterized as $$P_{rx}(d) = P_0 - 10\gamma \log_{10}(d/d_0) \quad (1)$$

where: $P_{rx}(d)$ is the receiving signal strength at distance d;

$P_0$ is receiving signal strength at the close-in reference distance $d_0$;

$\gamma$ is pass loss exponent; and assuming the reference distance $d_0 = 1$ meter, the well-known free-space propagation model gives $$P_0 = Tx + C \quad (2)$$

where C is a constant determined by antenna gain and channel band. Combining equation (1) and (2) results in:

$$P_{rx}(d) = Tx + f(d, \gamma)(f(d,\gamma) = C - 10\gamma \log_{10} d) \quad (3)$$

a received packet is valid if:

$$P_{rx}(d) \geq R\_t \quad (4)$$

and the channel is clear for transmission if the total energy of interference is:

$$P_I = 10\log_{10}\left(\sum_{i \in I} 10^{P_{rx}(di)/10}\right) \leq ED\_t \quad (5)$$

where I is the set of interference nodes. In order to make a successful transmission, the received SIR needs to be no lower than the minimum requirement SIR_t, i.e., $$P_{rx}(d) - P_I \geq SIR\_t \quad (6)$$

combining equations (4), (5), and (6) leads to $$ED\_t < R\_t - SIR\_t \quad (7)$$

In order to maximize the spatial reuse, the carrier sensing threshold needs to be set as high as possible. As a result, ED_t is configured as:

$$ED\_t = R\_t - SIR\_t \quad (8)$$

As previously indicated, the resulting energy detection threshold value (ED_t) may be used to determine whether a medium or channel of a wireless cell is clear for transmitting. In various embodiments, a table may be established, for example, in a cell node (either an access point or a station), to determine energy detection threshold value (ED_t) for various data rates. For example, for the case where the receiving sensitivity threshold (R_t) has been set at −70 dbm, the energy detection threshold (ED_t) for various data rates can be determined using equation (8) and the SIR values provided by the IEEE for each data rate:

| Data Rate (Mbps) | 11 | 5.5 | 2 | 1 |
| --- | --- | --- | --- | --- |
| SIR rate (db) - defined by IEEE | 21 | 18 | 14 | 11 |
| Energy detection threshold (dbm) | −91 | −88 | −84 | −81 |

This may be a look-up table that may be used by a cell node during clear channel assessment mode.

In terms of implementing the above process to determine and apply the appropriate receiving sensitivity threshold value (R_t) and energy detection threshold value (ED_t) to cell nodes, cell 102 of FIG. 1 is referred to in the following description. In some embodiment, the initial setting of the transmission power value (Tx) may be performed at AP1. In order to set the transmission power value (Tx), AP1 may communicate with AP2 and/or other access points and "negotiate" with them to set the transmission power value (Tx) for cell 102. Once the transmission power value (Tx) is set for cell 102, AP1 may transmit a signal to one or more of the stations belonging to cell 102 (i.e., STA1, STA2, and STA3). Alternatively, the transmission power value (Tx) may be set by one of the cell stations (i.e., STA1, STA2, and STA3) rather than by the access point AP1 by using AP1 as the interface for communicating and negotiating with the other access points (e.g., AP2) of other cells. Generally, however, the negotiating for determining Tx may be conducted when one AP negotiates with another AP or when an AP negotiates with a STA. In yet other embodiments, the transmission power values (Tx) for the cells 102, 104, and 106 may be set using a mechanism other than those described above such as by using a mechanism that is completely independent of the cells.

Once the transmission power value (Tx) is set or determined, the access point (AP) of a cell (e.g., cell 102) may determine a receiving sensitivity threshold value (R_t) based on the transmission power value (Tx) previously set. Alternatively, a station (STA) may determine the receiving sensitivity threshold value (R_t). The receiving sensitivity threshold value (R_t) may then be transmitted to the stations belonging to the same cell. Alternatively, each of the cell stations (STAs) may independently determine the receiving sensitivity threshold value based on the transmission power value (Tx) transmitted by the access point (AP). Finally, the energy detection threshold value (ED_t) may also be determined at the access point (AP1) or alternatively be determined at each of the stations (STAs).

Again, as previously indicated, although in the above embodiments, each of the nodes of a cell are depicted as being assigned to the same receiving sensitivity threshold value (R_t) and energy detection threshold value (ED_t), in other embodiments, the various nodes of the cell may have different receiving sensitivity threshold values (R_t) and/or energy detection threshold values (ED_t). That is, the novel aspect of embodiments of the invention does not rely solely on having each of the nodes employing exactly the same parameters. Therefore, in some embodiments, one or more of the cell nodes may have different receiving sensitivity threshold (R_t) and/or energy detection threshold values (ED_t).

Figure 3:
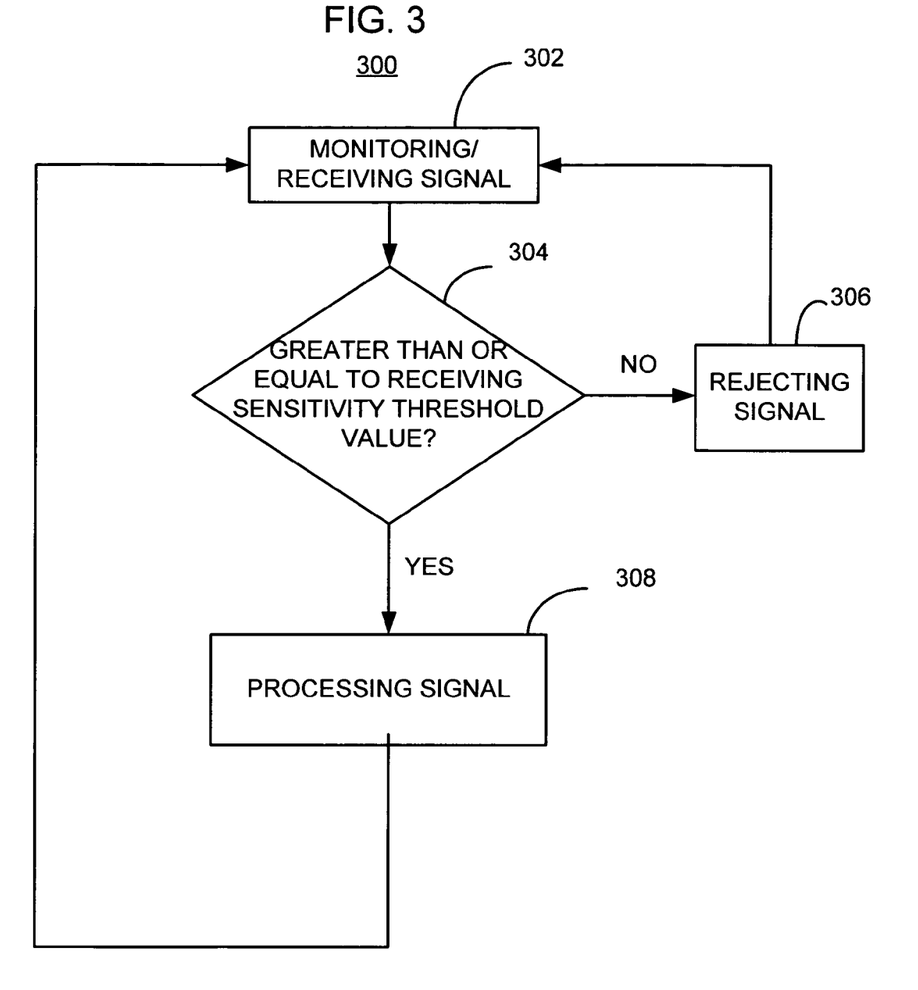
FIG. 3 illustrates a process for rejecting or processing a signal by a cell node in accordance with some embodiments.
Figure 4:
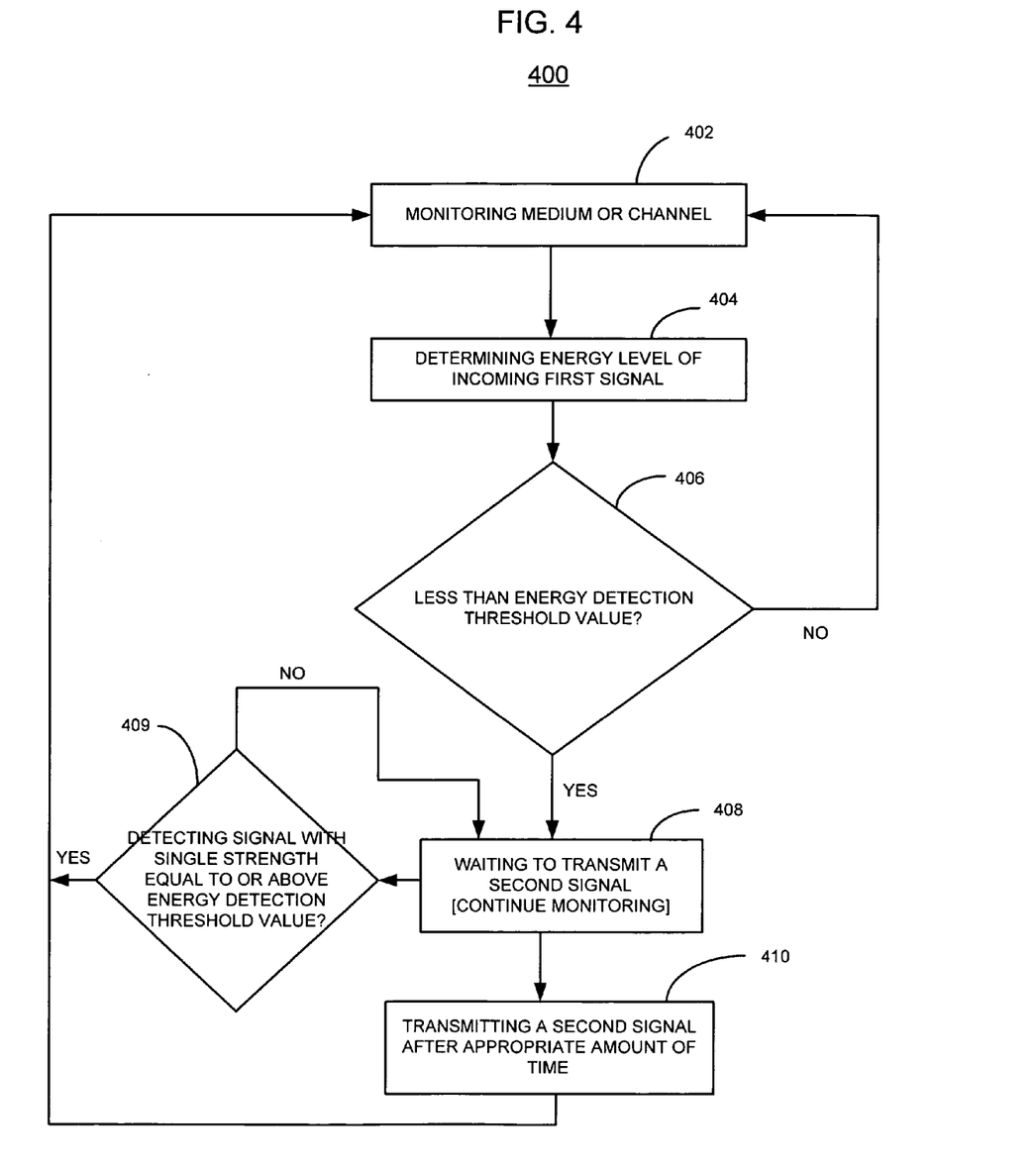
FIG. 4 illustrates a process for determining when a cell channel or medium is clear for transmitting a signal and based on this assessment, transmitting a signal in accordance with some embodiments.

FIGS. 3 and 4 depict example processes that may employ the receiving sensitivity threshold value (R_t) and the energy detection threshold (ED_t) that were determined in the above description. In particular, FIG. 3 depicts a process for rejecting or accepting a signal for processing in a wireless network based on a receiving sensitivity threshold value (R_t) in accordance with some embodiments. For the embodiments, the process 300 may be implemented by a cell node such as an access point (AP) or a station (STA). The process 300 may begin when the wireless medium of the cell is monitored for signals and if a signal is detected, receiving the signal at block 302. A determination may then be made as to whether the received signal's energy level is greater than or equal to the receiving sensitivity threshold value (R_t) at block 304. If the signal's energy level is lower than the receiving sensitivity threshold value (R_t) then the signal is rejected at block 306 and the process 300 returns to monitoring and/or receiving signals at block 302. If, on the other hand, the signal's energy level equals or exceeds the receiving sensitivity threshold value (R_t), then the signal may be processed at block 308. The signal being processed may include one or more frames that include data relating to audio, video, and/or other data. After receiving and processing the signal, the process 300 may continue to monitor and/or receive additional signals from the cell medium.

FIG. 4 depicts a process utilized by a cell node for clear channel assessment (CCA) in accordance with some embodiments. For the embodiments, the process 400 may begin when the cell medium (e.g., channel) may be monitored for an incoming signal at block 402. If an incoming signal ("the signal") is detected in the medium, then the energy level of the signal is determined at block 404. A comparison is made as to whether the energy level of the signal is less than the energy detection threshold value (ED_t) at block 406. The energy detection threshold value (ED_t) that is compared to may be obtained from the look-up table previously described. If the energy level of the signal is greater than or equal to the energy detection threshold value (ED_t) then the result of clear channel assessment is "Channel Busy" and no transmission is allowed. At this point, the process 400 returns to monitoring the medium at block 402 to determine whether the medium or channel is clear for transmitting signals.

If, on the other hand, if the signal is determined to have energy level less than the energy detection threshold value (ED_t), then the result of clear channel assessment is "Channel Clear." If the process 400 determines that there is "Channel Clear" then the process 400 goes to "waiting to transmit mode" at block 408. The "waiting to transmit mode" may correspond to the back-off period implemented in the contention window (CW). During the "waiting to transmit mode" at block 408, the process 400 may continue to monitor the channel (i.e., medium) and will return to block 402 if receiving any signal with strength equal or above ED_t during this period at block 409. After the process 400 stays in the "waiting to transmit mode" at block 408 for a certain amount of time (e.g., back-off time), the process 400 transmits another or transmission signal at block 410. After transmitting the transmission signal, the process 400 returns to monitoring of the medium or channel at block 402.

The clear channel assessment (CCA) process is performed by cell nodes to determine if the cell medium is clear of signals. If the medium is clear, a cell node may transmit a signal immediately or wait a random amount of time before transmitting a signal depending upon the protocol that is implemented. For example, under 802.11 standard medium access control (MAC) standards, different stations of a cell will transmit signals at different randomly assigned time periods. To determine whether the medium is clear for transmitting, the energy level of the medium may be continuously or periodically monitored and compared to the energy detection threshold (ED_t). An indication that the medium or channel is clear of signals may be determined once it is determined that the energy level of the medium has fallen below the energy detection threshold (ED_t). At that point, the node may send a signal through the medium or may wait a certain amount of time before sending the signal.

Figure 5:
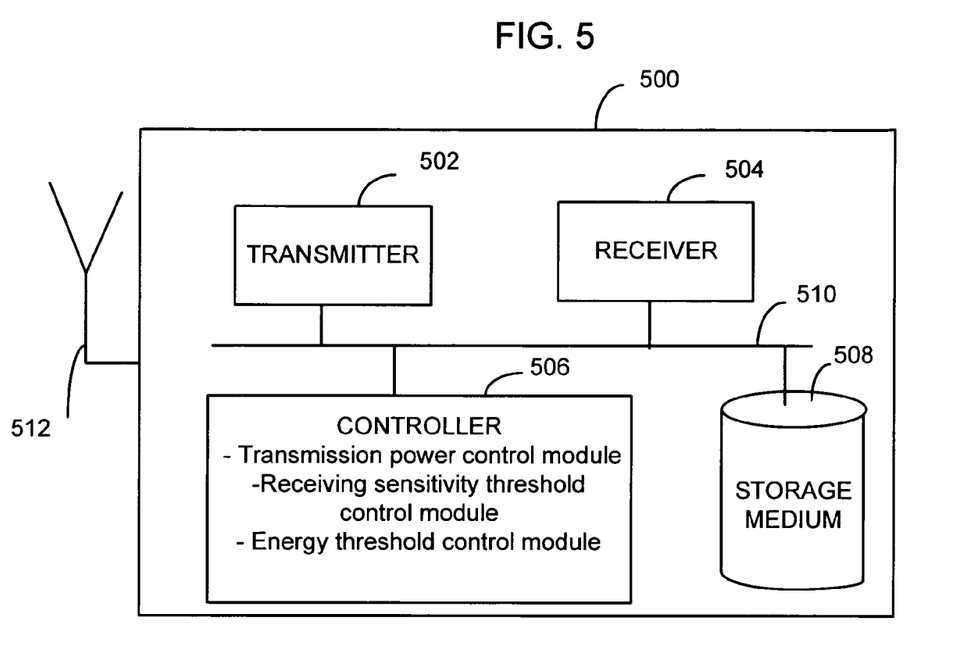
FIG. 5 is a block diagram of an example system (e.g. a node) for determining and applying a receiving sensitivity threshold value and/or energy detection threshold value in accordance with some embodiments.

FIG. 5 depicts a block diagram of a system for generating and/or applying various parameters such as transmission power threshold (Tx), receiving sensitivity threshold value (R_t), and/or energy detection threshold value (ED_1t) in accordance with some embodiments. The system 500 may be a cell node (either an access point (AP) or station (STA)) of a wireless network cell and may transmit these parameters to one or more nodes of a wireless network cell. The wireless network cell, in some embodiments, may be an 802.11 basic service set (BSS). For the embodiments, the system 500 may be a personal computer such as desktop, laptop, a server, a workstation, personal digital device (PDA), or other electronic devices.

In various embodiments, if the system 500 is an access point (AP), then it may be coupled to or interface with a wired network such as a local area network (LAN). The system 500 may also be a client or a station (STA) of the wireless network (e.g., 802.11 standard basic service set (BSS) network). The system 500 may include a transmitter 502, a receiver 504, a controller 506, a storage medium 508, an interconnect 510, and an antenna 512. In alternative embodiments, the transmitter 502 and/or receiver 504 may be supplemented or replaced by a transceiver. The transmitter 502 and/or receiver 504 may be directly or indirectly coupled to the antenna 512. In yet other embodiments, one or more substantially omnidirectional antenna(e) may be employed instead of the single antenna 512 depicted in FIG. 5. When multiple antennae are used, they may be used such that the system 500 has multiple input multiple output (MIMO) capabilities. In still yet other alternative embodiments, the antenna 512 may be a dipole antenna.

If the system 500 is an access point (AP) then the transmitter 502 along with the antenna 512 may be employed to communicate (i.e., transmit signals) with the access point or points of other cells and one or more stations within the cell that it belongs to. If the transmitter 502 transmits signals to access points of other cells, the transmitted signals, in some instances may contain data that may be used to "negotiate" with other access points in order to set transmission power values for each of the cells. In some embodiments, a transmission power value that is set by such communication exchanges may be assigned to each node within a cell so that each node of a cell will transmit signals at the same transmission power level. Further, if the system 500 is an access point, then the transmitter 502 may be used to transmit the transmission power value (Tx), the receiving sensitivity threshold value (R_t), and the energy detection threshold value (ED_t) to one or more clients or stations. The clients or stations may then use these parameters to determine whether a signal transmitted through the wireless medium is a valid signal and/or to determine whether a medium is clear for transmitting signals.

The receiver 504 may be employed by the system 500 to receive various signals transmitted by an access point and/or by a station. For example, if the system 500 is an access point, the receiver 504 along with the antenna 512, which may be an omnidirectional antenna, may receive signals from other access points during the transmission power determination process. The system 500 as an access point may further receive various types of signals from the stations that belong to the same network cell (e.g., BSS). On the other hand, if the system 500 is a station, then the receiver 504 may receive various signals that includes, for example, transmission power value (Tx), receiving sensitivity threshold value (R_t), and energy detection threshold value (ED_t) from the access point that the station is associated with. The data from such signals would be used by the station in order to determine at what power levels should signals be transmitted, when the medium or channel is clear for transmitting signals, and if a detected signal should be rejected or accepted for processing.

The system 500, in various embodiments, may include a controller 506 that is directly or indirectly coupled to at least the transmitter 502 and the receiver 504. The controller 506 may be employed to process and analyze various data received through the receiver 504 and to control the signals being transmitted by the transmitter 502. For example, the controller 506 may be designed to set the transmission power value (Tx), determine the receiving sensitivity threshold value (R_t) based at least in part on the transmission power value (Tx), and the energy detection threshold value (ED_t) based at least in part on the receiving sensitivity threshold value (R_t). Therefore, the controller 506 may include a transmission power control module, a receiving sensitivity threshold control module, and an energy detection threshold control module. The controller 506 may further be designed to transmit various data including transmission power value (Tx), receiving sensitivity threshold value (R_t), and energy detection threshold value (ED_t) to one or more nodes. The derivation of the receiving sensitivity threshold value (R_t) and the energy detection threshold value (ED_t) may be obtained using the processes described above. Further, the controller 506 may use the determined receiving sensitivity threshold value (R_t) and the energy detection threshold value (ED_t) to determine whether to accept or reject detected signals and when the cell medium or channel is clear for transmission. In various embodiments, the controller 506 may include a processor such as a microprocessor.

If the system 500 is a station rather than an access point, the controller 506 may not need to determine receiving sensitivity threshold and/or energy detection threshold values. Instead, such values may be obtained from, for example, an access point, and the controller 506 may apply these values to determine when signals that may be received are to be rejected or accepted for processing and when a cell medium or channel is clear for transmission. Alternatively, even if the system 500 is a station, the controller 506 may still be used to independently determine the receiving sensitivity threshold and energy detection threshold values if the access point only provides the transmission power value.

As described earlier, a storage medium 508 may also be included in the system 500 in various embodiments. The storage medium 508 may contain various data including, for example, parameters and protocols used in, for example, 802.11 MAC standards. The storage medium 508 may contain transmission power value (Tx), receiving sensitivity threshold value (R_t), and energy detection threshold value (ED_t). Further, tables such as the look-up table described previously for determining different energy detection levels for different data rates may be stored in the storage medium 508. The storage medium 508, in various embodiments, may be a hard drive device, SRAM, DRAM, or other types of memory devices. In alternative embodiments, the various data described above may be stored elsewhere other than in the storage medium 508. For example, the look-up table described above may be, in some instances, hardwired into the controller 506 in some embodiments. Each of the above components may be coupled to an interconnect 510. In some embodiments, the interconnect 510 may be a bus.

The system 500, in various embodiments, may be employed as one of the nodes of, for example, wireless cell 102 depicted in FIG. 1. The cell 102 includes a plurality of cell nodes. The cell nodes may include at least one access point (AP1) and one or more stations (STA1, STA2, and STA3). Each of the cell nodes may or may not be designed similar to the system 500 of FIG. 5. The cell 102 in various embodiments may be a wireless network 802.11 basic service set (BSS) cell.

Accordingly, methods and apparatuses for transmitting and receiving signals using receiving sensitivity threshold and/or energy detection threshold values have been described. Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those of ordinary skill in the art will readily appreciate that the present invention may be implemented in a very wide variety of embodiments. This description therefore is intended to be regarded as illustrative instead of restrictive on embodiments of the present invention.

What is claimed is:

1. A method of communicating by a node in a wireless network, comprising:
    setting a transmission power value to be employed for signal transmission by the node, the set transmission power value being associated with a cell size of the wireless network; and
    determining a receiving sensitivity threshold value for signal receiving sensing of the node based at least in part on matching a receiving range associated with the receiving sensitivity threshold value to the cell size.

2. The method of claim 1, further comprising receiving a signal and processing the signal if the signal exceeds or equals the receiving sensitivity threshold value.

3. The method of claim 1, further comprising determining an energy detection threshold of the node based at least in part on the determined receiving sensitivity threshold value.

4. The method of claim 3, wherein said determining of an energy detection threshold value is based at least in part on the equation:

$$ED\_t = R\_t - SIR\_t$$

wherein ED_t is an energy detection threshold value, R_t is a receiving sensitivity threshold value, and SIR_t is a signal-to-interference ratio to sustain a specific throughput of a given data rate.

5. The method of claim 3, further comprising receiving a signal and determining an energy level for the signal.

6. The method of claim 5, further comprising comparing the energy level of the signal to the energy detection threshold value, and if the energy level of the signal is lower than the energy detection threshold value, transmitting another signal.

7. The method of claim 6, wherein said comparing is performed during a clear channel assessment (CCA) mode.

8. The method of claim 1, wherein said selecting comprises selecting the transmission power value by negotiating with another node of another wireless network.

9. An apparatus, comprising:
    a transmitter to transmit signals over a wireless medium; and
    a controller coupled to the transmitter, the controller designed to set a transmission power value, associated with a cell size of a wireless network within which the apparatus is deployed, to be employed by the transmitter to transmit signal, and to determine a receiving sensitivity threshold value for signal receiving sensing based at least in part on matching a receiving range associated with the receiving sensitivity threshold value to the cell size.

10. The apparatus of claim 9, wherein the controller is further designed to cause the transmitter to transmit a signal containing the receiving sensitivity threshold value to one or more nodes.

11. The apparatus of claim 9, further comprising a receiver to receive a signal, and the controller is designed to process the signal received through the receiver only if the signal exceeds or equals the determined receiving sensitivity threshold value.

12. The apparatus of claim 9, wherein the controller is designed to determine an energy detection threshold value based at least in part on the determined receiving sensitivity threshold value.

13. The apparatus of claim 12, wherein the apparatus further comprises a receiver designed to receive a signal, and the apparatus is designed to determine an energy level of the signal.

14. The apparatus of claim 13, wherein the controller is designed to compare the energy level of the signal to the energy detection threshold value, and if the energy level of the signal is lower than the energy detection threshold value, cause the transmitter to transmit another signal.

15. The apparatus of claim 14, wherein said controller is designed to compare the energy level of the signal to the energy detection threshold value during clear channel assessment (CCA) mode.

16. The apparatus of claim 12, further comprising a storage medium, the storage medium including a look-up table containing energy detection threshold values associated with different data rates.

17. The apparatus of claim 9, wherein the apparatus is an access point (AP) or a station (STA).

18. A method of communicating by a node in a wireless network, comprising:
    setting a transmission power value to be employed for signal transmission by the node;
    determining a receiving sensitivity threshold value for signal receiving sensing of the node based at least in part on the set transmission power value; and determining an energy detection threshold of the node based at least in part on the determined receiving sensitivity threshold value, said determining of the energy detection threshold value based at least in part on the equation:

$$ED\_t = R\_t - SIR\_t$$

wherein ED_t is an energy detection threshold value R_t is a receiving sensitivity threshold value, and SIR_t is a signal-to-interference ratio to sustain a specific throughput of a given data rate.

* * * * *

UNITED STATES PATENT AND TRADEMARK OFFICE
CERTIFICATE OF CORRECTION

PATENT NO. : 7,526,308 B2
APPLICATION NO. : 11/118225
DATED : April 28, 2009
INVENTOR(S) : Guo et al.

It is certified that error appears in the above-identified patent and that said Letters Patent is hereby corrected as shown below:

Column 12
Line 1, "...threshold value $R\_t$ is..." should read --...threshold value, $R\_t$ is...--.

Signed and Sealed this

Sixth Day of April, 2010

David J. Kappos
*Director of the United States Patent and Trademark Office*